June 28, 1966  W. H. GOODING  3,258,107
MULTIPLE FEED UNLOADER
Filed Sept. 25, 1964  2 Sheets-Sheet 1
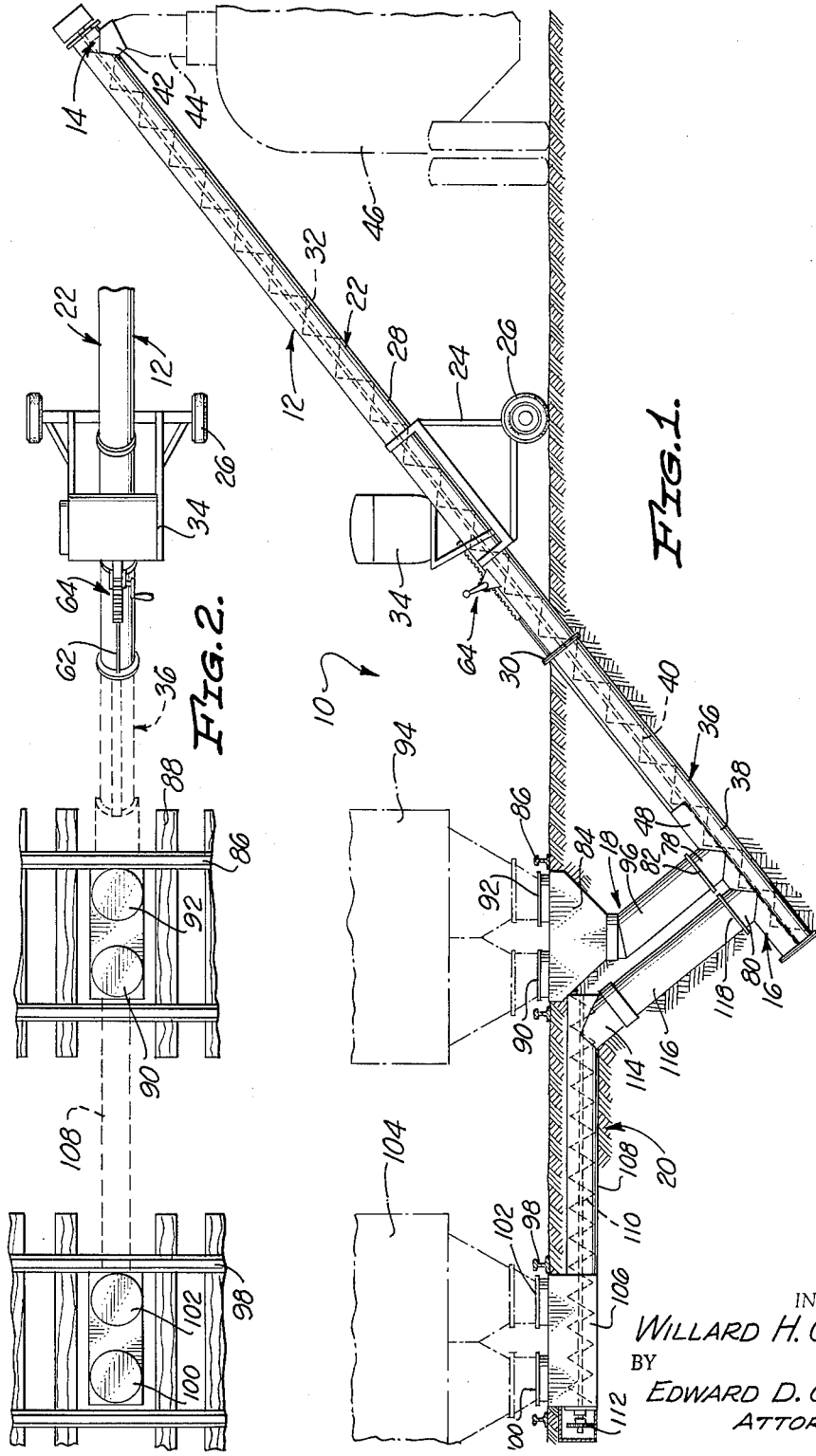
INVENTOR.
WILLARD H. GOODING
BY
EDWARD D. O'BRIAN
ATTORNEY

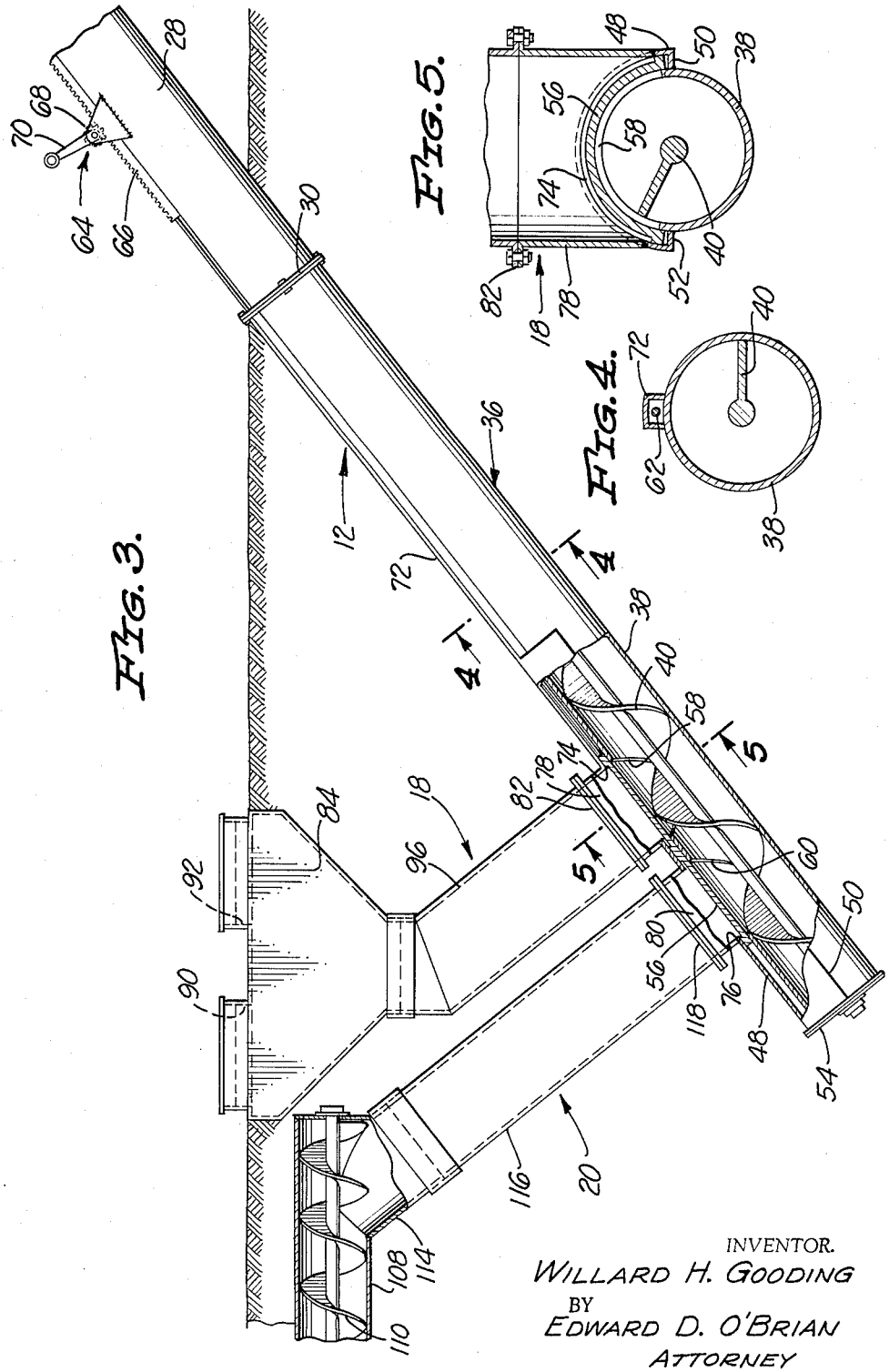

United States Patent Office 3,258,107
Patented June 28, 1966

3,258,107
MULTIPLE FEED UNLOADER
Willard H. Gooding, Los Angeles, Calif., assignor to Western Velo & Cement Specialties Company, Los Angeles, Calif., a corporation of California
Filed Sept. 25, 1964, Ser. No. 399,176
2 Claims. (Cl. 198—64)

This invention is directed to an unloader of such configuration as to permit the unloader to receive material from two different, remote input points, and to deliver such material to an output.

In the conveyor art, it is common to furnish fixed unloaders which receive material from one point and deliver material to another point. When a different receiving point is desired, it is common to move the unloader to such a point for that purpose. However, this is time consuming and costly for selecting of the point of receipt of material to the unloader necessitates the considerable work of moving the unloader.

Accordingly it is an object of this invention to provide an unloader which, in fixed position, selectively receives material from two different points where such materials may be received. It is another object of this invention to provide an unloader which receives materials selectively from two different input points and elevates and conveys such material to a single discharge point. It is another object of this invention to provide a screw conveyor particularly adapted to handle granular materials selectively from two or more points. It is another object of this invention to provide a conveyor system which is inexpensive of construction, of limited maintenance and of expanded utility so that material may be moved to different sources selectively at low cost, low maintenance and low investment within a maximum of convenience.

Other objects and advantages of this invention will become apparent from a study of the following portion of this specification, the claims and the drawings in which:

FIG. 1 is a side elevational view of the unloader of this invention installed in position, partly below the ground as a section through the ground adjacent the conveyor;

FIG. 2 is a top plan view, partly broken away, of the portion of the unloader of FIG. 1 which extends above the ground;

FIG. 3 is an enlarged partial side elevational view, with parts broken away, of a portion of the unloader shown in FIG. 1;

FIG. 4 is a section taken along the line 4—4 of FIG. 3; and

FIG. 5 is a section taken along the line 5—5 of FIG. 3.

As an aid to understanding this invention, it can be stated in essentially summary form that it is directed to an unloader having multiple locations where material can be delivered to the unloader structure. The unloader comprises an upwardly inclined screw conveyor particularly adapted for the elevation of granular materials. The lower end of this screw conveyor is at least semi-permanently buried in the ground and extends beneath a first unloading point. This unloading point comprises a first hopper, for example between railroad tracks and a downwardly inclined chute connecting the first hopper to the lower end of the screw conveyor. A second hopper is provided away from the first hopper, and may also be located between railroad tracks, in this case a second set of parallel tracks. This hopper directly discharges to a horizontal screw conveyor which conveys granular material to a second downwardly inclined chute which deposits this material into the upwardly inclined conveyor adjacent its lower end. A selectively operable gate structure selectively closes both chutes or opens one of them for discharge of material from a chute to the lower end of the upwardly inclined screw conveyor. From the following description it can be clearly seen that this double feed unloader is particularly suitable for the handling of dry cement. Dry cement must be protected from moisture and other contamination, and the unloading structure described below is particularly suitable for this purpose.

This invention will be understood in greater detail by reference to the following portion of this specification wherein the drawings are referred to. Referring now to FIG. 1, the unloader of this invention is shown generally at 10. The unloader 10 comprises screw elevator 12, discharge structure 14, inlet gate structure 16, first hopper and chute structure 18 and second hopper, conveyor and chute structure 20.

The inclined screw elevator 12 is similar in construction to that shown and described in my co-pending application Ser. No. 348,202 filed Feb. 28, 1964, the entire disclosure of which is incorporated herein by this reference. The screw elevator 12 has an upper section 22 above the ground level which is mounted on supporting frame 24 which has wheels 26 suitably rotatably supported on an axle. The cylindrical housing 28 of the upper portion 22 is secured at flange 30 to the lower portion in the manner described in the above mentioned disclosure. Within the housing 28 is a screw flight 32 which, when rotated, is suitable for the elevation of granular materials therein axially upward along the cylindrical housing 28. The pitch of the screw flight 32 in conjunction with the upward angularity of screw elevator 12, and the physical characteristics of the granular material to be elevated, permit elevation of such granular materials in this way. Prime mover 34, an electric or internal combustion prime mover is mounted on the upper section 22 adjacent the supporting frame 24 and is connected to rotate the screw flight 32 in the appropriate direction for the elevation of materials. Flange 30 is at approximately ground level and lower portion 36 of the screw elevator 12 comprises a cylindrical housing 38 which is secured to the upper portion 22 by means of flange 30. Lower inclined screw flight 40 is connected to the upper screw flight 32 adjacent the flange 30 so that the flange 30 may be disconnected, and the screw flights 32 and 40 separated from each other so that the entire upper portion 22 of the screw elevator 12 may be removed from the flight with minimum inconvenience and labor.

Thus, the upper portion 22 and the lower portion 36 can be secured together to form an upwardly inclined screw elevator 12 which is disconnectable at generally ground level and which is arranged for the elevation of granular materials from a location from beneath ground level to above ground level.

Discharge from the upper end of screw elevator 12 is through discharge structure 14 which can be in the nature of a conventional opening in the lower side of cylindrical housing 28 with a discharge nozzle 42 secured thereat. If desired a discharge chute 44, of flexible material such as heavy canvas, can be secured to the discharge spout 42 for directly discharging the material into a suitable opening in the top of the means to which the material is to be delivered. As shown in dot-dash lines in the drawings, this means can be a highway vehicle such as truck 46 especially suited for the hauling of granular materials of this nature. The preferred discharge structure 14 is that shown in my co-pending application Ser. No. 258,214, filed Feb. 13, 1963, now Patent No. 3,173,459, the entire disclosure of which is incorporated herein by this reference, for such structure is eminently suited to the reduction of free dust in the surrounding atmosphere.

The lower end of the screw elevator structure 12 is provided with a gate housing 48 of substantially hemicylindrical configuration embracing the upper half of the lower end of cylindrical housing 38, see FIGS. 3 and 5, in such a manner as to be spaced therefrom, but sealed with respect thereto by means of substantially radial walls 50 and 52, by lower closure flange 54 and suitable upper end closure. The space between the gate housing 48 and cylindrical housing 28 is sufficient to accept substantially hemi-cylindrical gate 56 for reciprocable axial motion therein. Upper or first opening 58 and lower or second opening 60 are openings in the cylindrical housing 38 to permit access of material into the interior of housing 38 for its elevation. Both of openings 58 and 60 are positioned within the confines of the gate housing 48, and are positioned in such a manner that when gate 56 is positioned in its central position, both openings 58 and 60 are closed. The gate structure is preferably similar to the construction defined in my co-pending patent application, Ser. No. 258,205 filed Feb. 13, 1963, now Patent No. 3,178,009 the entire disclosure of which is incorporated herein by this reference.

Gate operating rod 62 extends out of the gate housing 48 and is connected to gate 56 for its control, and extends above the ground level to gate operating mechanism 64 at a position convenient for manual operation. The gate operating mechanism is in the form of a rack 66 guided for reciprocable motion and a pinion 68 in engagement therewith. Manual operating means such as a crank or lever 70 is connected to rotate pinion 68 and thus move gate operating rod 62 reciprocably along the axis of the screw elevator 12. It can be seen that when the operating rod 62 is moved to the left, as seen in FIG. 3, the upper opening 58 is uncovered by gate 56. Similarly when the gate 56 is moved to the right by operating rod 62, the opening 60 is uncovered by gate 56. The gate 56 and its gate housing 48 are of such dimensions as to permit the opening of either one of the upper or lower openings 58 or 60. As is seen in FIG. 4, the operating rod 62 is enclosed within housing 72 which extends up to ground level to protect the rod from contamination by the surrounding soil and to permit it to be easily operated.

The housing 48 has upper and lower openings 74 and 76 which correspondingly face the upper and lower openings 58 and 60 in the cylindrical housing 38. Inlet pipes 78 and 80 are respectively secured to a gate housing 48 around the openings 74 and 76 so that complete closure is obtained and the interior of the inlet pipes communicate, with appropriate positions of the gate 56, with the interior of cylindrical housing 38.

Secured to inlet pipe 78 is the first hopper and chute 18 by means of flange structure 82. The first hopper and chute structure 18 comprises a hopper 84 of such dimension as to be positionable between railroad tracks or underneath the pavement of a driveway so that a vehicle may be discharged thereto. As is seen in FIGS. 1 and 2, railroad tracks 86 are positioned above the lower end of the screw elevator 12 and hopper 84 is positioned therebetween. Furthermore, hopper 84 is of such dimension as to occupy a space of only one railroad tie 88. The hopper 84 has openings 90 and 92 which corresponds to the openings in the bottom of the standard railroad car, such as railroad car 94 particularly designed for the sealed hauling of bulk granular commodities such as dry cement. The hopper 84 and its connecting structure to the railroad car are more fully described in my patent application, Ser. No. 258,215, filed Feb. 13, 1963, the entire disclosure of which is incorporated herein by this reference. Cylindrical chute 96 connects the hopper 84 to the flange structure 82 so that sealed continuity of bulk cement from railroad car 94 to the interior of screw elevator 12 in sealed manner is provided.

The second hopper and chute structure 20 is similarly positioned between railroad tracks 98 and is again of such configuration as to occupy only one tie space therein. Again first and second openings 100 and 102 are provided which are connectable to a railroad car 104 in sealed manner as has been hereinbefore described. The openings 100 and 102 are provided in hopper 106 the bottom half of which has a hemi-cylindrical cross section. Connected to hopper 106, and axially aligned with the hemi-cylindrical cross section is conveyor barrel 108 which contains screw conveyor flight 110. Conveyor barrel 108 has drive means 112 arranged for the rotation of screw flight 110, and drive means 112 can be propelled by prime mover 34, or any other convenient means such as an electric motor positioned therewith.

Conveyor barrel 108 extends toward and terminates adjacent to hopper 84 and has a downwardly directed discharge spout 114 secured in sealed relationship with respect thereto. Discharge spout 114 is connected to chute 116 which extends downward parallel to and adjacent to chute 96. Chute 116 terminates at and is secured to flange means 118 to provide a continuous sealed passage from the openings 100 and 102 to the interior of the cylindrical conveyor housing 38.

By means of this structure continuous flow to a conveyor and accordingly from the conveyor can be easily accomplished. For example, a first railroad car 94 is positioned over the openings 90 and 92 and connected to the hopper 84. Thereupon, the gates in the interior of the railroad car 94 are opened and granular material is discharged into hopper 84 in chute 96. After the screw flights 32 and 40 are rotating, and a receiver such as truck 46 is positioned to receive the material discharged out of discharge chute 14, the gate 56 is moved downward to open the chute 96 into the interior of conveyor barrel 38. Thereupon material is elevated so long as the gate 56 is held open, the supply in the car 94 is not exhausted and the screw flights 32 and 40 are rotated. Moving the gate 56 upward to close the opening 58 will shut off the flow of granular material through the screw elevator 12 so that receivers 46 can be changed. However, operation proceeds virtually continuously until the car 94 is exhausted. Rather than delay the operation of the screw elevator 12 while the care 94 is moved away and a full one is moved into place, the car 104 has previously been positioned over the openings 100 and 102, and connected thereto. When car 94 is exhausted, the openings in the bottom of car 104 are opened, screw conveyor flight 110 is rotated and gate 56 is moved upwardly to open the lower opening 60. Thus cement type material is moved from the car 100 through hopper 106 and screw conveyor 108, down chute 116 to the interior of screw elevator 12 virtually without interruption of the operation of the elevator. While the car 104 is being exhausted, the car 94 is removed and a full one positioned so that when car 104 is exhausted unloading can further proceed from the new car on track 86.

The immediately preceding portion of this specification defines the preferred embodiment shown in the drawings. It is clear, however, that a plurality of more than two inlet structures are capable of being used with the screw conveyor 12. For example, in addition to the first hopper and chute 18 two or more structures similar to the second hopper, conveyor and chute construction 20 can be connected to the lower end of screw elevator 12. In such a case, the gate structure 16 for controlling the discharge of material from a chute into the lower end of the screw conveyor 12 can be readily converted to accept material from any one of the three or more chutes for selective connection of any one of the plurality to the screw elevator 12. Another way in which a plurality of vehicle discharge points can be connected to the screw elevator 12 is to extend the conveyor barrel 108 and its associated screw flight 110 under a plurality of hoppers 106, preferably arranged in a line under a plurality of parallel railroad tracks. By this means material could be dumped into the horizontal conveyor through any one of a plurality of hoppers 106 to be moved to the chute 116 and thus discharged through the bottom end of screw elevator 12. Thus it is clear that any plurality of chutes can discharge materials selectively to the lower end of screw elevator 12.

With slight modifications of the gate structure 16 from the preferred embodiment shown, the plural inlets to the screw elevator can be used for the blending of materials. Thus, if cement is discharged through chute 96 and a sand and gravel mixture is discharged through chute 116, an appropriate gate structure 16 can be adjusted to have both of the chutes partially open to the bottom of the screw elevator 12. The gate would be adjustable to increase one opening while decreasing the other so that the ratio of the incoming materials can be adjusted. The material would be at least partially blended in the screw elevator 12. Similarly, with a structure having three inlet chutes and an appropriate gate structure 16, sand, gravel and cement can be separately discharged and metered to the lower end of screw elevator 12. A certain amount of blending would take place in the elevator. The gate structure 16 in this case would necessarily be of the sort where all three of the incoming constituents could be separately regulated. Of course, such regulation can be partially accomplished by the speed of the screw 110 and a similar screw connected to a third hopper similar to hopper 106. Thus, sand and gravel could be separately regulated by screw speed and cement flow could be regulated by the gate structure 16. Of course, in such a case the chute 116 and its companion from the other horizontal screw conveyor would discharge in open fashion, without gate control into the lower end of screw elevator 12.

Thus, a plurality of inlets, more than the two shown in the preferred embodiment, are within the scope of this invention. Similarly, two or more inlet structures can be used for discharging a plurality of different materials to the bottom of the screw elevator 12, for partial blending and discharge of the composite through the discharge structure 14.

It can be seen from the structure defined above, that the double feed structure of this invention is susceptible to numerous modifications and changes without the exercise of the inventive faculty. Accordingly the scope of this invention is defined by the scope of the following claims.

I claim:
1. An unloader structure comprising an upwardly inclined screw elevator having a substantially cylindrical upwardly inclined housing and a screw flight rotatably positioned therein, said screw flight and said barrel being arranged to elevate granular materials therein, motive means to rotate said screw flight within said elevator housing, discharge means adjacent the upper end of said elevator housing, said discharge means being adapted to convey material away from the upper end of said elevator housing; first and second openings adjacent the lower end of said elevator housing, a gate housing positioned around the lower end of said elevator housing and embracing said first and second openings therein and in engagement with said elevator housing, first and second openings in said gate housing, first and second chutes connected to said gate housing respectively around said first and second openings therein, said first and second chutes extending angularly upward, a gate positioned within said gate housing, gate operating means positioned on said elevator housing and connected to said gate to operate said gate, said gate being reciprocally movable by said gate operating means so as to selectively cover one or the other of said first and second openings; first hopper means connected to said first chute, said first hopper means being adapted to receive granular materials, second hopper means connected to said second chute, said second hopper means being adapted to receive granular material so that said first and said second hopper means can be selectively connected by movement of said gate within said gate housing to permit granular material to selectively flow from said first and from said second hopper means into said elevator housing.

2. The unloader structure of claim 1 wherein a screw conveyor having a barrel and a screw flight within said barrel is connected between said second hopper means and said second chute so as to convey granular materials from said second hopper to said second chute and then into the said elevator housing.

References Cited by the Examiner
UNITED STATES PATENTS

| | | | |
|---|---|---|---|
| 1,631,119 | 6/1927 | Collins | 198—64 |
| 2,027,958 | 1/1936 | Carter | 198—64 |
| 3,085,674 | 4/1963 | Gooding | 198—64 |

EVON C. BLUNK, *Primary Examiner.*

SAMUEL F. COLEMAN, *Examiner.*

R. WALKER, *Assistant Examiner.*